INVENTOR.
WILLIAM M. WATERS
BY Charles J. Elderkin

May 4, 1965 W. M. WATERS 3,182,206

MULTIDIMENSIONAL PULSE HEIGHT TRACKERS

Filed Jan. 29, 1962

6 Sheets-Sheet 2

INVENTOR.
WILLIAM M. WATERS
BY Charles J. Elderkin

INVENTOR.
WILLIAM M. WATERS
BY Charles J. Elderkin

INVENTOR.
WILLIAM M. WATERS
BY Charles J. Elderkin

INVENTOR.
WILLIAM M. WATERS
BY Charles J. Elderkin

INVENTOR.

WILLIAM M. WATERS

BY Charles J Eldeskin

United States Patent Office 3,182,206

Patented May 4, 1965

3,182,206

MULTIDIMENSIONAL PULSE HEIGHT TRACKERS

William M. Waters, Baltimore, Md. (% Electronic Communications Inc., 1830 York Road, Timonium, Md.)

Filed Jan. 29, 1962, Ser. No. 169,288
4 Claims. (Cl. 307—88.5)

This invention relates to pulse height trackers and more particularly to pulse height trackers which are automatic and multidimensional.

There are many instances where several distinct groups of pulses are mixed in a single signal and must be separated before any effective use can be made of intelligence carried by the pulses. For example, if a single radio receiver detects energy pulses from two separate transmitters, as well as noise from the atmosphere, the pulses from one transmitter must generally be separated from the pulses from the other transmitter, as well as from the noise, before the pulse can be effectively decoded. Another example is in a scintillation counter where it is desirable to separate detected bursts of radiation energy into distinct energy ranges, since the quantity of energy in the pulses is significant in identifying the source of the radiation.

Pulse amplitude discriminators have been employed to separate pulses in accordance with their amplitude. Usually, these discriminators have a predetermined amplitude acceptance interval, i.e., a predetermined width or amplitude distance between the minimum and maximum accepted values, and a predetermined mean or midpoint value. If the characteristics of the pulses to be separated are known, it is possible to adjust the acceptance interval to include only the desired pulses and to reject all other pulses. Manually adjustable pulse amplitude filters of this type, while being very useful in separating pulses of known characteristics, are at a disadvantage when separating out a group of pulses where the distinguishing feature is not known ahead of time.

Another disadvantage of past pulse amplitude discriminators is that they are capable of examining only one characteristic of an incoming pulse. If, for example, an incoming signal includes pulses of three groups, pulses of the first group being distinguished by a different frequency, pulses of the second group being distinguished by a different amplitude, and pulses of the third group having the same amplitude as pulses in the first group and the same frequency as pulses in the second group, then it is obvious that these groups can be separated only by making a two-dimensional comparison, i.e., comparing amplitude and frequency simultaneously.

The incoming pulses can each be converted into several separate pulse trains wherein the pulse amplitude signifies the magnitude of a particular characteristic. A multidimensional pulse amplitude discriminator must then simultaneously examine the amplitude of corresponding pulses in all the pulse trains in order to make identification of a particular group of pulses on the basis of all characteristics being examined. Effective multidimensional pulse amplitude discriminators as such have not been available in the past.

An object of this invention is to provide a multidimensional pulse height tracker which can identify incoming pulses on the basis of more than one characteristic. Also, it is an object to provide such a pulse height tracker which is automatically adjusted in accordance with the characteristics of the incoming pulses.

Another object of the invention is to provide a pluse height tracker capable of separating out a group of pulses of which the distinguishing feature is not predetermined.

Still another object is to provide a pulse height discriminator in which the width of the amplitude acceptance interval is automatically adjustable.

Yet another object is to provide a pulse height discriminator in which the mean value of the amplitude acceptance interval is automatically adjustable.

A still further object of the invention is to provide a method for automatically adjusting the width and mean value of a pulse height discriminator acceptance interval to include only a desired group of pulses.

In order that the manner in which these and other objects are attained in accordance with the invention can be understood in detail, reference is had to the accompanying drawings, which form a part of this specification, and wherein:

FIGS. 1*a* and 1*b* are curves illustrating an amplitude probability distribution of a group of pulses;

Figure 7:
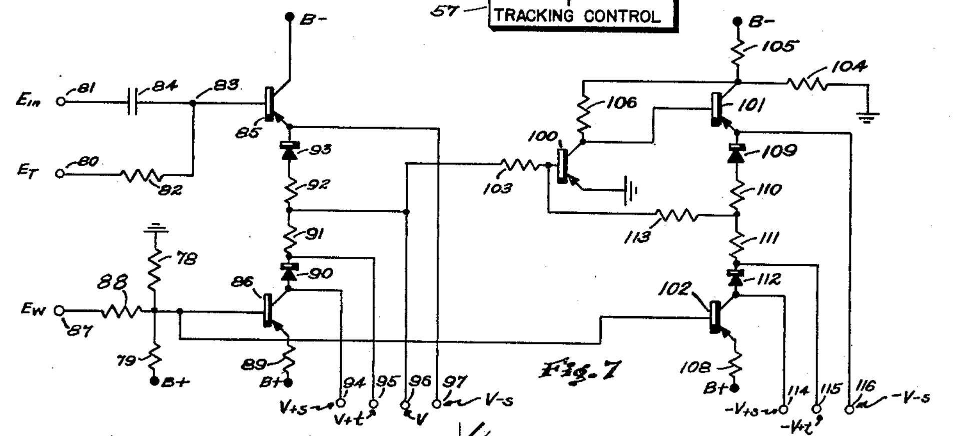
Figures 7A, 7B, 7C, 7D, 7H:
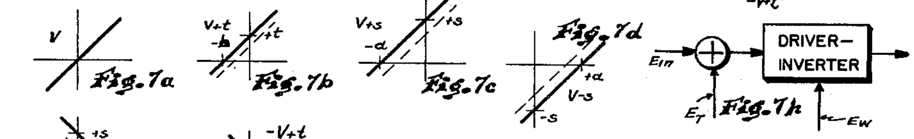
Figure 12:
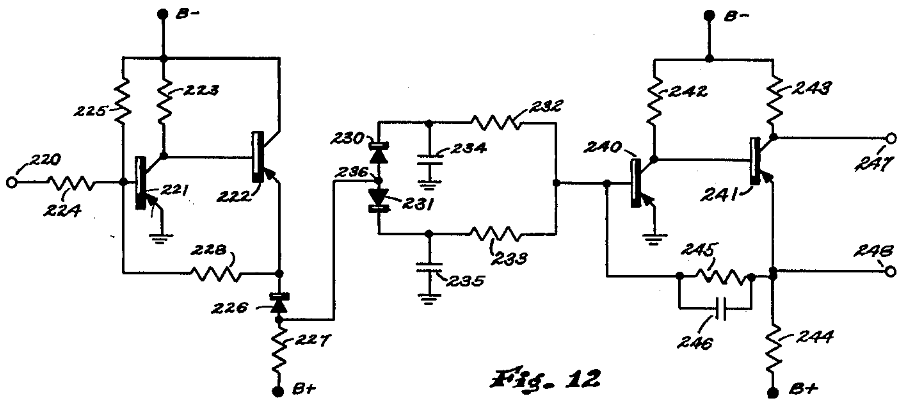
Figure 12A:
Figure 13:
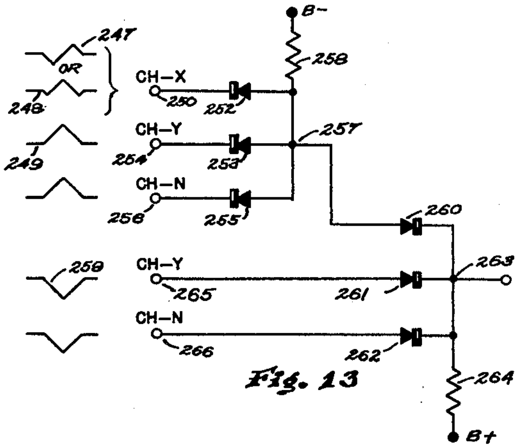
Figure 13A:
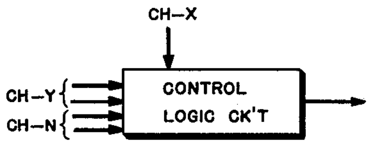
Figure 16:
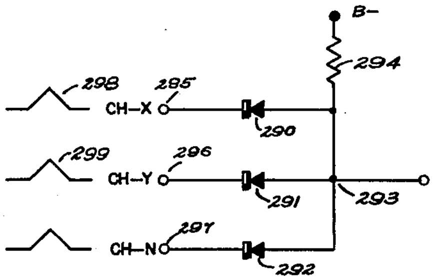
Figure 16A:
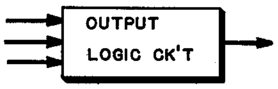
Figures 14, 15, 17:
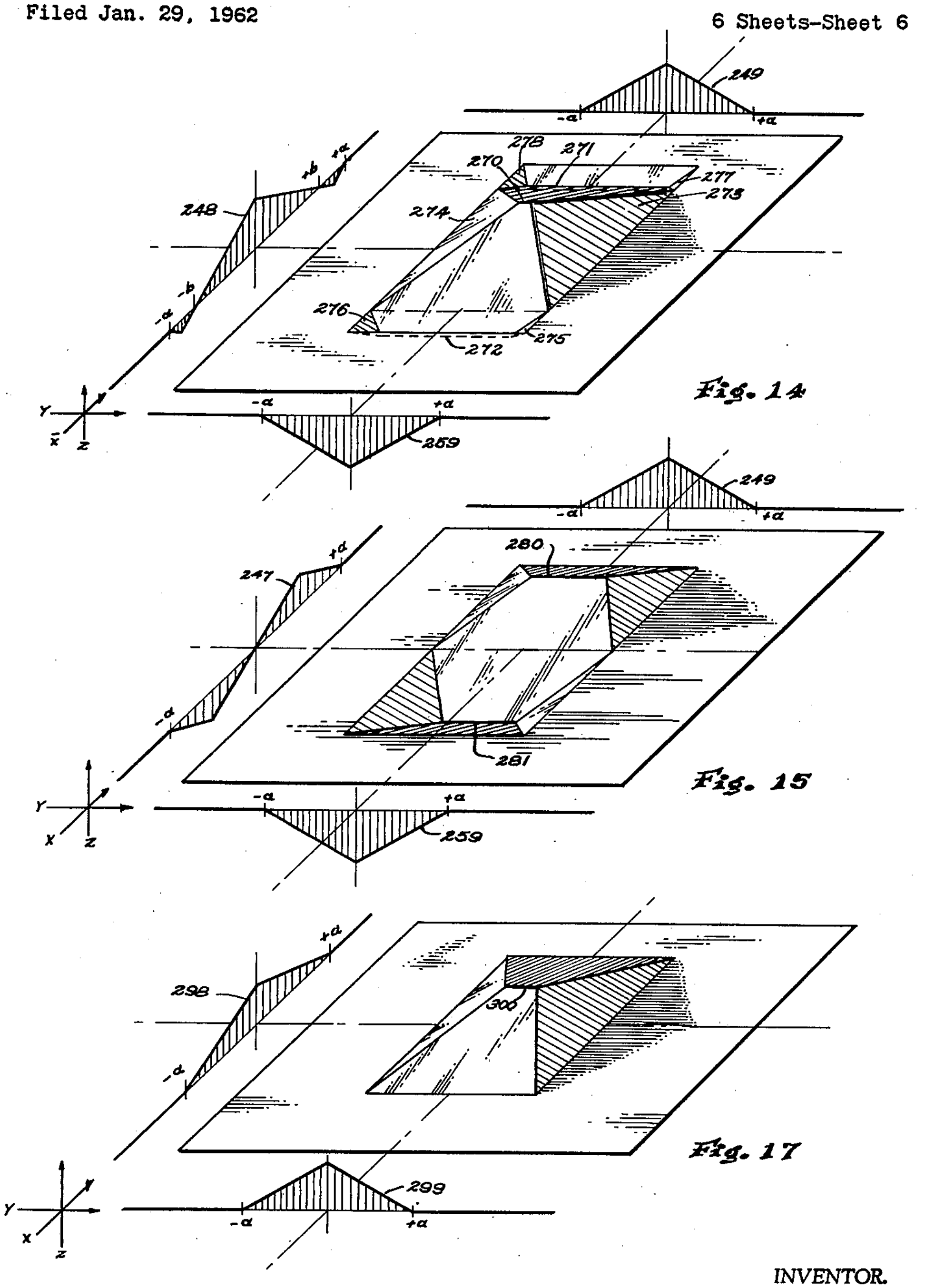

FIGS. 7 and 7*h* are schematic and block diagrams, respectively, of the inverter-driver circuits;

FIGS. 7*a*–7*g* are curves showing the input-output characteristics at the various output terminals in the inverter-driver circuit of FIG. 7;

FIGS. 8–11 illustrate schematically the four nonlinear circuits which are illustrated in block form in FIGS. 8*a*–11*a*, respectively;

FIGS. 12 and 12*a* are schematic and block diagrams, respectively, of the integrating feedback amplifiers;

FIGS. 13 and 13*a* are schematic and block diagrams, respectively, of the control logic circuits;

FIG. 14 is a three-dimensional curve showing the input-output characteristic from a control logic circuit when employed in a width control circuit;

FIG. 15 is a three-dimensional curve showing the input-out characteristic from a control logic circuit when employed in a tracking control circuit;

FIGS. 16 and 16*a* are schematic and block diagrams, respectively, of an output logic circuit; and FIG. 17 is a three-dimensional curve showing the input-output characteristic from an output logic circuit.

GENERAL DESCRIPTION

Figure 1A:
Figure 1B:
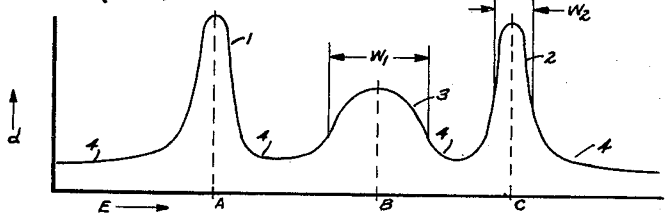

The concept of the invention can most easily be explained by first referring to FIGS. 1*a* and 1*b* which illustrate the probability distribution of a group of incoming pulses. Assume that an incoming signal is as shown in FIG. 1 containing a large number of pulses. This incoming pulse train includes a relatively large number of pulses having a voltage amplitude A, and also a relatively large number of pulses having a voltage amplitude C. Also included in this pulse train is a third group of pulses which are amplitude modulated about a mean amplitude value B.

In FIG. 1*b*, a probability distribution curve is shown for the train of pulses shown in FIG. 1*a*. The density of pulses of amplitudes A and C is reasonably high, and therefore the modes 1 and 2 appear on the distribution curve. Since the pulses of amplitudes A and C each tend to have the same amplitude as other pulses in the respective group, the modes 1 and 2 are very narrow. The amplitude modulated pulses having an average amplitude B provide mode 3 on the distribution curve. This mode is relatively wide, since the pulses forming the mode are modulated and vary over a wider range of amplitude values.

The probability distribution curve in FIG. 1*b* indicates that there are three distinct groups of pulses which undoubtedly originated from three different sources, or are characteristic of three distinct functions. The purpose of this invention is to provide method and apparatus for automatically separating one of these groups of pulses from the other groups, as well as from noise pulses having amplitudes in the valleys 4 of the probability distribution curve. The group of pulses forming mode 3, for example, can be separated by an amplitude discriminator having an amplitude interval width W1 and a mean value, or midpoint value, of amplitude B. Similarly, the pulses creating mode 2 can be separated by an amplitude discriminator having an amplitude interval of width W2 and mean amplitude C.

The separation of these groups of pulses is accomplished in accordance with this invention even though neither the width nor the mean value of a group of pulses is known in advance. An automatic amplitude discriminator, referred to as a pulse height tracker, is provided in accordance with this invention having an amplitude interval in which both the width and the mean value are automatically adjustable to adapt to a train of incoming pulses to automatically separate out one group of pulses. This is accompilshed by employing two separate feedback loops. The first feedback loop operates in response to the dispersion of pulses within the amplitude interval, and operates to narrow the amplitude interval until only a single mode falls within the amplitude interval. The second feedback loop operates simultaneously in response to the amplitude values of pulses within the amplitude interval, to adjust the mean value of the amplitude interval to center upon the average value of pulses within the interval. In practice, it is found more expedient to employ an amplitude discriminator having a variable width and a fixed mean value, and then effectively vary the mean value by changing the amplitude of all incoming pulses, thus effecting the same end result. With both of the feedback loops operating simultaneously, the pulse height tracker eventually adjusts itself to select only pulses within one particular mode of the probability distribution curve. Where it is desirable to select more than one group of pulses, additional pulse height trackers can be interconnected so that they cannot select the pulses in the same mode and hence as many different groups of pulses as desired can be separated out.

The method employed for automatically adjusting the amplitude interval in accordance with this invention is to initially begin with a very wide amplitude interval which includes virtually all pulses of the incoming pulse train. The width of the amplitude interval is then made gradually narrow in accordance with the amplitude dispersion of pulses which remain within the amplitude interval. While the amplitude interval is being made narrow, the mean value of the amplitude interval is also adjusted in accordance with the average amplitude value of pulses remaining within the amplitude interval. The amplitude interval is so adjusted until only pulses of a single mode of the probability distribution curve remain within the amplitude interval.

A particular advantage of this type of pulse height tracker is that it may easily be combined with other similar units to provide a multidimensional pulse height tracker. A multidimenisonal pulse height tracker is employed in situations where it is desirable to select a group of incoming pulses on the basis of more than one characteristic of the incoming signal. Under these circumstances, a converter is employed which converts the incoming signal into a number of separate pulse trains wherein each pulse has an amplitude representative of a characteristic. In other words, each incoming pulse is converted into a number of separate pulses, each appearing in a different pulse train and each having an amplitude representative of a different characteristic of the incoming pulse. A multidimensional pulse height tracker in accordance with this invention has a number of separate channels each receiving a different pulse train. Each of the channels includes a separate pulse height tracker unit which is responsive only to pulses within the amplitude interval when all other channels simultaneously receive a pulse within their respective amplitude intervals. In this manner, a group of pulses can automatically be selected on the basis of the multidimensional probability distribution.

*One-dimensional circuits*

Figure 2:
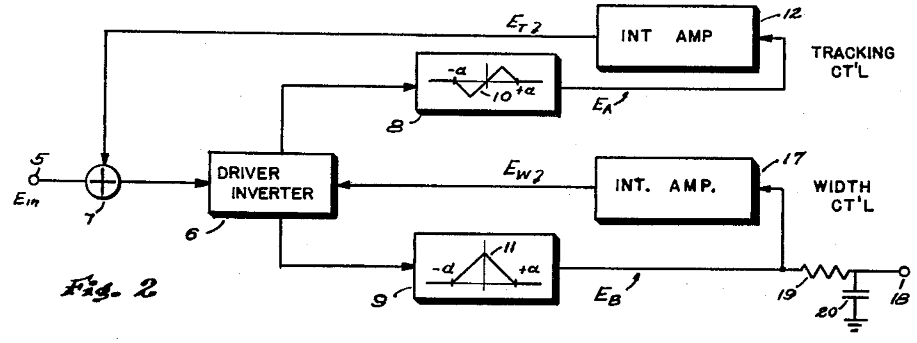
FIG. 2 is a block diagram illustrating a one-dimensional pulse height tracker in accordance with one embodiment of the invention.

A one-dimensional pulse height tracker is illustrated in block form in FIG. 2. The incoming pulses are applied to input terminal 5 and are supplied to a driver-inverter circuit 6 via a mixing unit 7. The driver-inverter circuit provides a number of output signals to the nonlinear circuits 8 and 9 having input-output characteristics, as indicated by the curves 10 and 11, respectively.

The output signal $E_A$ from nonlinear circuit 8 consists of a series of pulses which are amplified, inverted and integrated by a tracking control circuit 12, thus providing a direct current control signal $E_T$ which is mixed with the incoming pulses in mixing unit 7.

The width control circuit 17 includes an integrating, amplifier circuit to amplify and integrate the pulse in signal $E_B$ provided by nonlinear circuit 9, thereby deriving a direct current control signal $E_W$ which is applied to the driver-inverter circuit 6. The control signal $E_W$ operates through the driver-inverter circuit to control the value of $a$, thus in effect controlling the width of the amplitude interval or the distance between $-a$ and $+a$ in the input-output characteristics 10 and 11.

Output terminal 18 is connected to receive pulses in signal $E_B$ from nonlinear circuit 9 via a filter circuit including a series connected resistance 19 and a parallel capacitor 20 connected to ground. The filter circuit removes unwanted spikes from the output signal $E_B$ to eliminate false output indications.

Figure 3:
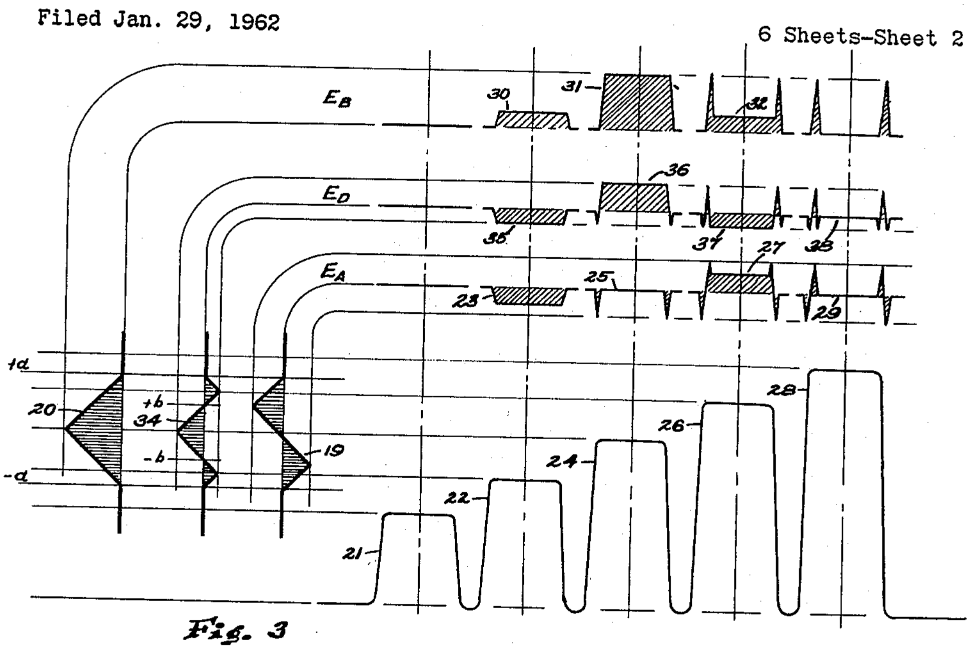
FIG. 3 is a chart illustrating the effect of certain nonlinear circuits on pulses of varying amplitudes.

The effect of the nonlinear circuits 8 and 9 on pulses of various amplitudes is illustrated in FIG. 3. The curve 19 is the same as curve 10 except shown vertically and curve 20 similarly corresponds to curve 11. The curves 19 and 20 represent the relation between the amplitude of an input signal applied to the driver-inverter circuit on the vertical axis, and the coresponding output from the nonlinear circuit on the horizontal axis.

If an input pulse 21 having an amplitude less than the value $-a$ is applied to nonlinear circuit 8, curve 19 indicates that there would be no output signal. If an input pulse 22 having an amplitude exceeding the value $-a$ is applied, curve 19 indicates that a negative pulse 23 would be provided at the output. An input pulse 24, having an amplitude at the midpoint between $-a$ and $+a$, provides no substantial output as indicated at 25, and an input pulse 26, having an amplitude somewhat less than the value $+a$, provides a predominantly positive output pulse 27. An input pulse 28, having an amplitude exceeding the value $+a$, provides no substantial output pulse, as indicated at 29. It is significant to note that pulses having an amplitude outside the range from $-a$ to $+a$ provide no substantial output indication. Also, input pulses having an amplitude between $-a$ and the midpoint value provide negative output pulses, while input pulses having an amplitude between the midpoint value and $+a$ provide positive output pulses.

If the same pulses 21, 22, 24, 26 and 28 are applied through nonlinear circuit 9, the output pulses 30–32 would appear. It should be noted that the output pulses from this circuit appear only if the amplitude of the incoming pulse is between the values $-a$ and $+a$, and that the output pulse is always positive, having a maximum value when the incoming pulse has an amplitude corresponding to the midpoint value between $-a$ and $+a$.

In the operation of the pulse height tracker of FIG. 2, initially the control voltage $E_W$ is zero and therefore the width of the amplitude interval between $-a$ and $+a$ is maximum. The bias of the integrating amplifier 12 in the tracking control circuit is so adjusted to initially provide a substantial control voltage $E_T$ to insure that the pulse train base line value does not fall within the acceptance interval. If this were not done, and the base line value, i.e., the amplitude value (usually zero) that the incoming signal assumes in the absence of a pulse, were within the amplitude interval, then a substantial output would be provided in the absence of a pulse causing false tracking.

Since the initial amplitude interval is very wide, the amplitude of virtually all the incoming pulses fall within the amplitude interval between $-a$ and $+a$, and therefore a large number of positive pulses appear at the output of nonlinear circuit 9 to be applied to integrating amplifier 17 of the width control circuit. As the positive pulses are applied to the width control circuit, the control voltage E gradually increases, tending to narrow the width of the amplitude interval. At the same time, pulses are provided by nonlinear circuit 8 and are amplified, inverted and integrated by tracking control circuit 12. The value of the control voltage $E_T$ depends upon the relationship between the average amplitude value of the incoming pulses and the midpoint value of the amplitude interval between $-a$ and $+a$. Accordingly, the direct current control signal $E_T$ becomes more negative if the majority of incoming pulses lie in the region above the midpoint value, and becomes more positive if the majority of pulses lie below the midpoint value. Since the control voltage $E_T$ is mixed with the incoming pulses from terminal 5, the average value of the pulses as applied to driver-inverter circuit 6 tends to coincide with the midpoint value of the amplitude interval.

The width control circuit 17 continues to narrow the amplitude interval until an equilibrium point is reached where only a certain portion of the incoming pulses lie within the amplitude interval. At this point, a further narrowing of the amplitude interval would decrease the control voltage $E_W$, tending to make the interval wider, but as the amplitude interval tends to become wider the control voltage increases to make the amplitude interval narrower. This point of equilibrium depends primarily on the gain of the width control circuit and can be established to maintain the desired portion of pulses within the amplitude interval. The tracking control circuit, meanwhile, after having received a large enough sample of pulses, establishes a control voltage $E_T$ which, via mixing circuit 7, changes the amplitude of all incoming pulses so that those pulses which are within the amplitude interval are centered within the interval. It is seen that, with both control circuits 12 and 17 adjusting simultaneously, the amplitude interval is eventually adjusted to include only pulses within a particular mode of the probability distribution curve. Thereafter, any time an input pulse is received which lies within the selected amplitude interval, a positive pulse is provided at output terminal 18, indicating the occurrence of this event.

In many instances, it is necessary that the width control circuit operate more precisely in relation to the amplitude dispersion of pulses within a mode of the probability distribution curve, instead of merely operating in accordance with the proportion of the number of pulses within the interval. A more precise width control circuit is illustrated in block form in the one-dimensional pulse height tracker shown in block form in FIG. 4. The driver-inverter circuit 6, mixing circuit 7 and nonlinear circuits 8 and 9 are essentially the same as those previously described in connection with FIG. 2, and therefore similar reference numerals are employed. Tracking control circuit 12, connected between the output from nonlinear circuit 8 and mixing circuit 7, operates in essentially the same manner as in FIG. 2, and the output signal appearing at output terminal 18 is provided from the nonlinear circuit 9 in essentially the same manner. The width control circuit 17 which provides a control signal $E_W$ to the driver-inverter circuit 6 is essentially the same as that in FIG. 2, except that the input signal $E_D$ is derived from a different nonlinear circuit 33.

The input-output characteristic of nonlinear circuit 33 is such that, if the amplitude of the applied signal is between the value of $-b$ and $-a$, or between $+b$ and $+a$, a negative output signal is provided, whereas if the amplitude of the incoming signal is between $-b$ and $+b$, a positive output signal is provided. The effect of pulses having various amplitudes upon this nonlinear circuit is illustrated in FIG. 3, wherein curve 34 represents the input-output characteristic of nonlinear circuit 33. Pulse 21, having an amplitude less than $-a$, provides no output signal; pulse 22, having an amplitude between $-a$ and $-b$, provides a negative output signal 35; pulse 24, having an amplitude between $-b$ and $+b$ provides a predominantly positive output signal 36; pulse 26, having an amplitude between $+b$ and $+a$, provides a predominantly negative output indication 37; and pulse 28, having an amplitude exceeding $+a$, provides no substantial output indication, as indicated at 38.

Figure 4:
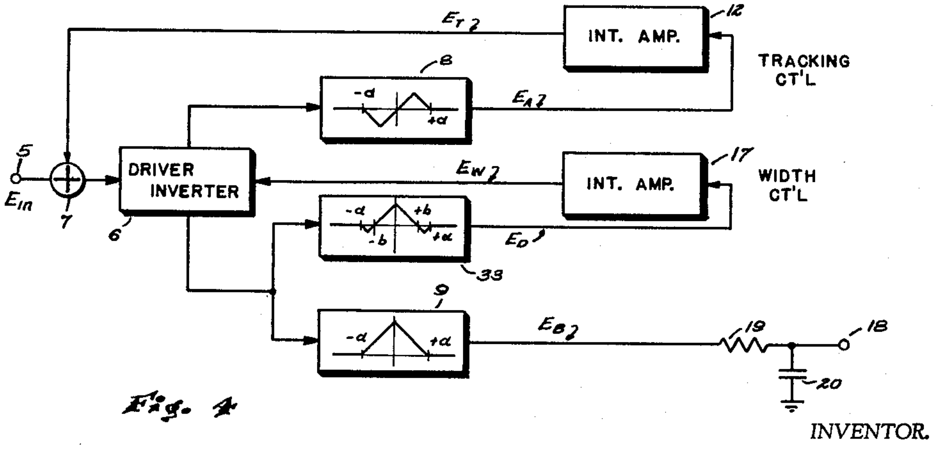
FIG. 4 is a block diagram illustrating a one-dimensional pulse height tracker in accordance with a second embodiment.

In the operation of the pulse height tracker of FIG. 4, initially the amplitude interval $-a$ to $+a$ is very wide and therefore most of the pulses will lie in the positive region between $-b$ and $+b$ and therefore the width control circuit 17 begins to narrow the amplitude interval. As the amplitude interval becomes narrower, the values of $-b$ and $+b$ are decreased proportionally to the decrease in the values of $-a$ and $+a$. Accordingly, the width control circuit 17 will narrow the amplitude interval until a substantial number of the incoming pulses fall within the negative regions between $-a$ to $-b$ and $+b$ to $+a$. At this point, the positive region between $-b$ and $+b$ is slightly inside the width of the probability distribution mode, but the total amplitude interval which is between $-a$ and $+a$ is just bounding the sides of the mode. Accordingly, the width control circuit very accurately adjusts the amplitude interval of the pulse height tracker in accordance with the width of the probability distribution mode.

*Multidimensional circuits*

Figure 5:
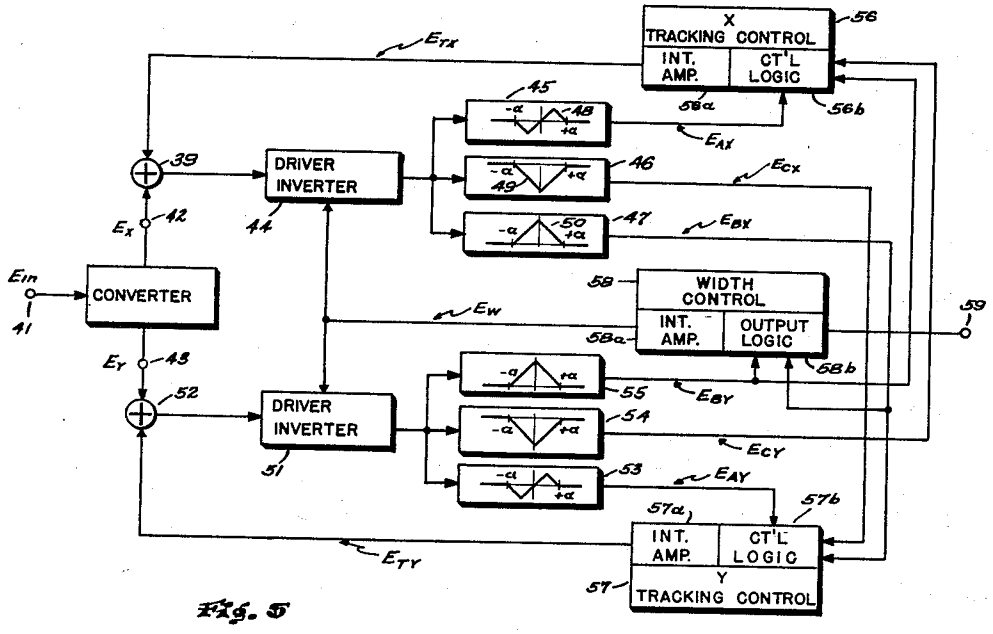
FIG. 5 is a block diagram of a two-dimensional pulse height tracker.

A two-dimensional pulse height tracker is shown in block form in FIG. 5. In this embodiment, the input signal is applied to a converter 40 via input terminal 41. The converter unit provides two separate pulse trains supplied to terminals 42 and 43, each of the pulse trains having pulses which occur simultaneously but with an amplitude representative of a different characteristic of the incoming signal at terminal 41. Converter unit 40 is not described in detail, since such units are commercially available and since this unit does not form a portion of this invention. For illustrative purposes, however, if the incoming signal applied at terminal 41 comprises a number of distinct pulses, then the amplitude pulses in the two pulse trains developed could represent any one of a number of characteristics, for example, the frequency, pulse width, rise time, fall time, etc., of the incoming pulses. If the signal applied at terminal 41 does not contain distinct pulses, converter unit 40 could be constructed to include a circuit for periodically sampling the incoming signal to derive the output pulse trains. The essential feature of the converter circuit 40 is that it provides related pulses simultaneously which correspond to different characteristics of the incoming signal.

Each train of pulses is applied to a separate channel of the unit wherein each channel includes a pulse height tracker similar to the one-dimensional pulse height tracker previously described in FIGS. 2 and 4. Circuitry interconnecting the two channels must be added, however, so that the tracking and width control circuits operate only when each channel simultaneously has an input pulse within its respective amplitude interval.

Channel X of the two-dimensional pulse height tracker includes a driver-inverter circuit 44 which receives the pulse train applied at terminal 42 via mixing unit 39. Driver-inverter circuit 44 provides output signals which are combined in nonlinear circuits 45, 46 and 47, having input-output characteristics 48–50, respectively. Nonlinear circuit 45, which has a characteristic essentially the same as that described by curve 19 in FIG. 3, provides an output signal $E_{AX}$, and nonlinear circuit 47, which has a characteristic essentially the same as that described by curve 20 in FIG. 3, provides an output signal $E_{BX}$. Nonlinear circuit 46 provides output signals $E_{CX}$ and has an input-output characteristic essentially the same as nonlinear circuit 47, except that the polarity of the output is reversed. Channel Y is similar and includes a driver-inverter circuit 51 being provided by pulses applied to terminal 43 of the mixing unit 52. Driver-inverter circuit 51 provides signals which are combined in nonlinear circuits 53–55, providing corresponding output signals $E_{AY}$, $E_{CY}$, and $E_{BY}$. The input-output characteristics of nonlinear circuits 53–55 are essentially the same as those of nonlinear circuits 45–47, respectively.

The X tracking control circuit 56 is essentially the same as the tracking control circuit 12 described in FIGS. 2 and 4 and is operative in response to the signal $E_{AX}$ developed in nonlinear circuit 45, to provide a control signal $E_{TX}$ for varying the amplitude of signals supplied to the driver-inverter circuit 44. The integrating amplifier portion 56*a* therefore amplifies, inverts and integrates pulses in signal $E_{AX}$. Tracking control circuit 56 also includes a control logic circuit 56*b* at the input so that the signal $E_{AX}$ is effective only if the corresponding pulse in the Y channel is within the Y channel amplitude interval. Thus, even though a pulse applied at terminal 42 is within the amplitude interval of the X channel, and therefore provides an output pulse via nonlinear circuit 45, this pulse is not effective to vary the output from the tracking control circuit 56 unless the corresponding pulse applied to terminal 43 is within the amplitude interval of the Y channel to provide a positive pulse from nonlinear circuit 55 and a negative pulse from nonlinear circuit 54. The input-output characteristic of the logic circuit which combines signals $E_{AX}$, $E_{BY}$, and $E_{CY}$ is described with reference to FIG. 15 in greater detail hereinafter. The Y tracking control circuit 57 is similarly operative in response to the signal $E_{AY}$ from nonlinear circuit 53 in channel Y, and from signals $E_{CX}$ from nonlinear circuit 46, and $E_{BX}$ from nonlinear circuit 47 in channel X. The output from tracking control circuit 57 ($E_{TY}$) varies the amplitude of pulses applied to the driver inverter circuit 51.

In the embodiment of FIG. 5, a single width control circuit is employed which provides a control signal $E_W$ which is applied to both driver-inverter circuits 44 and 51 to vary the amplitude interval of both channels simultaneously. In many instances, the ratio of the desired amplitude interval width in one channel to the amplitude interval width in the other channel is known and therefore a single width control circuit will suffice.

The input to width control circuit 58 includes a logic circuit 58*b*, referred to as the output logic circuit, which provides output pulses to the integrating amplifier portion 58*a* only when a pulse is received from both nonlinear circuit 47 and nonlinear circuit 55, or, in other words, only when signal $E_{BX}$ and $E_{BY}$ are both positive simultaneously. Accordingly, the width of the amplitude interval in both channels is varied in accordance with the proportion of pulses within the amplitude interval of both channels.

The output from the logic circuit portion 58*b* also provides an indication when a desired pulse is detected, i.e., a pulse which is within the amplitude interval of both channels. The output from the output logic circuit 58*b* is connected to output terminal 59. The input-output characteristic from the output logic circuit 58*b* is described hereinafter in greater detail in connection with FIG. 17.

In operation, the width control circuit 58 initially provides no control potential and therefore the amplitude interval in both channels is very wide and all pulses applied to terminals 42 and 43 provide an output indication via the various nonlinear circuits. As output pulses are developed through nonlinear circuits 47 and 55, a control signal is developed which narrows the amplitude interval in both channels. The X and Y tracking control circuits each operates on the basis of pulses which remain within the amplitude interval of both channels to vary the amplitude of pulses applied to their respective channels. The magnitude of the control signal developed by the tracking control circuits, however, is determined by the mean value of applied pulses within the amplitude interval of the respective channels. Eventually, an equilibrium point is reached where the desired proportion of pulses fall within the amplitude intervals of both channels simultaneously, and hence a certain group of pulses is selected from the larger group of pulses on a two-dimensional basis.

Figure 6:
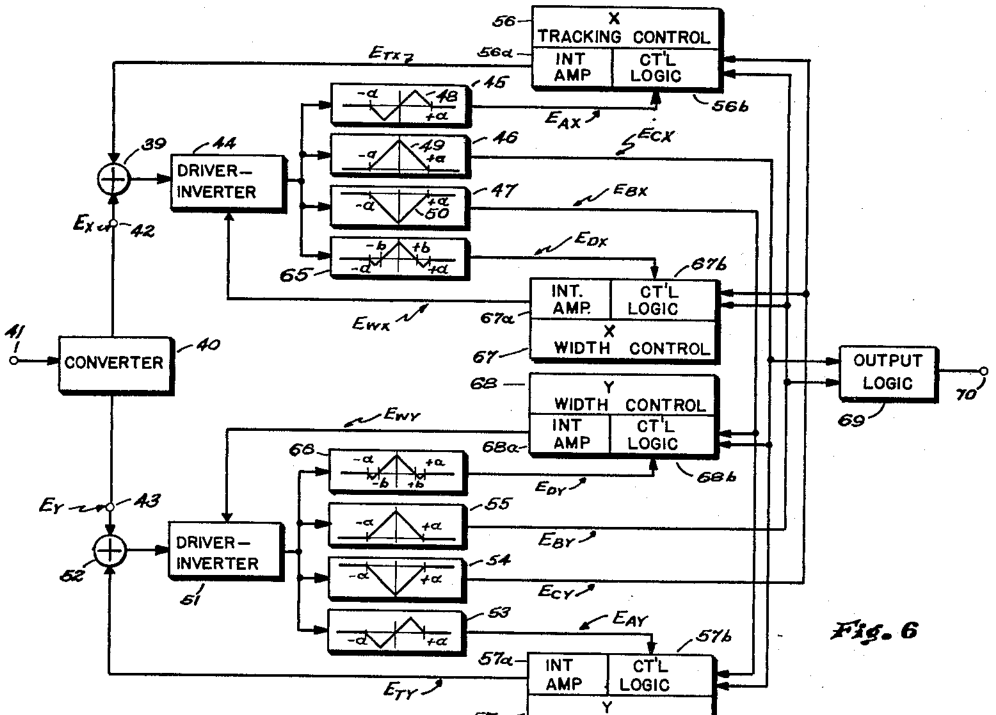
FIG. 6 is a block diagram of another two-dimensional pulse height tracker.

In FIG. 6, another embodiment of a two-dimensional pulse height tracker is illustrated in which each channel is provided with independent amplitude interval width control. Many component portions of this unit are essentially the same as those previously described in connection with FIG. 5 and hence like reference numerals are employed. Furthermore, the X tracking control circuit 56 and the Y tracking control circuit 57 are connected in the same manner and operate in the same manner as previously described with reference to FIG. 5.

An additional nonlinear circuit 65 is added to channel X, and an additional nonlinear circuit 66 is added to channel Y. The input-output characteristics of nonlinear circuits 65 and 66 are as previously described by curve 34 in FIG. 3. The output $E_{DX}$ from nonlinear circuit 65 is supplied to an X width control circuit 67 to provide a control signal $E_{WX}$ for controlling the amplitude interval in the X channel via the driver-inverter circuit 44. Similarly, the signal $E_{DY}$ from nonlinear circuit 56 is supplied to a Y width control circuit 68 to provide a control signal $E_{WY}$ which controls the amplitude interval in the Y channel via driver-inverter circuit 51.

The X width control circuit 67 includes logic circuit portion 67*b* which prevents any pulses developed via nonlinear circuit 65 from affecting the width control signal when the corresponding pulse in the Y channel is not within the amplitude interval of the Y channel. If the pulse applied to the Y channel via terminal 43 is within the amplitude interval of channel Y, a positive and negative pulse, respectively, is developed by nonlinear circuits 55 and 54, and these positive and negative pulses are applied to the logic circuitry within the X width control circuit 67. The pulses in signal $E_{CX}$ from nonlinear circuit 65 can affect the width control signal $E_{WX}$ in the X channel only if both of these positive and negative pulses are present. Similarly, the Y width control circuit 68 includes logic circuit portion 68*b* connected to nonlinear circuits 46 and 47 in the X channel and hence permit only those pulses within the amplitude interval of both channels to affect the control signal $E_{WY}$. Width control circuits 67 and 68 include integrating amplifier portions 67*a* and 68*a*, respectively, to amplify and integrate the signals from the respective logic circuits.

The output circuit 69 is essentially an AND logic circuit which provides an output pulse to terminal 70 only when a positive pulse is received simultaneously from nonlinear circuit 47 in the X channel and nonlinear circuit 55 in the Y channel. When both positive pulses are present at the input to logic circuit 69, it is an indication that input pulses have been provided to both channels simultaneously which are within the amplitude interval of their respective channels.

It is specifically pointed out that the circuits in FIGS. 5 and 6 can easily be extended to include additional dimensions by adding additional channels. For example, if it were desirable to add a third channel to the unit shown in FIG. 5, it is merely necessary to add an additional channel and extend the logic circuitry at the input of the tracking control circuits and the width control circuit. More specifically, the X tracking control circuit 56 would still operate in response to the output signal $E_{AX}$ developed by nonlinear circuit 45, but would operate in response to this signal only if the corresponding pulse in both the Y channel and the additional third channel were within their respective amplitude intervals. In like fashion, the operation of the Y tracking control circuit 57 would be inhibited whenever the pulse in the X channel or the additional third channel is not within the respective amplitude interval. Width control circuit 58 is modified to be operative only in response to positive pulses received from all three channels simultaneously. Thus, the circuit illustrated in FIG. 5 could, in this manner, be extended to include as many additional channels and hence as many additional dimensions as is desired.

The two-dimensional pulse height tracker illustrated in FIG. 6 could similarly be extended to include as many additional dimensions as is desirable. This is accomplished by extending the logic circuitry at the input of the tracking control circuits and the width control circuits to inhibit the effect of the signal from their respective channel whenever the corresponding pulses applied to all of the other channels are not within their respective amplitude intervals.

*Driver-inverter circuits and mixing units*

The driver-inverter circuits and mixing units in FIGS. 2, 4, 5 and 6 are represented in block form in FIG. 7*h* and are illustrated schematically in FIG. 7.

The purpose of the mixing unit is to combine the feedback control signal from the tracking control circuit with the incoming pulses to vary the average amplitude of the pulses. The purpose of the driver-inverter circuit is (1) to provide the various required signals which are combined in the nonlinear circuits, and (2) to vary the width of the amplitude intervals of the nonlinear circuits in accordance with the control signal developed by the width control circuit.

The mixing unit includes input terminal 80, which is connected to the tracking control circuit, and input terminal 81 to which the incoming train of pulses is applied. A resistance 82 is connected between terminal 80 and junction 83, and a capacitor 84 is connected between terminal 81 and junction 83. The incoming pulses, as applied to terminal 81, pass through capacitor 84 and lose their direct current reference potential. A new reference potential is applied via resistance 82 in accordance with the output of the tracking control circuit. Accordingly, the signal appearing at junction 83 is essentially the same as that appearing at terminal 81, except that the average amplitude of the pulses has been changed.

The driver-inverter circuit includes an emitter follower transistor circuit, for convenience referred to as the driver circuit, followed by an inverting transistor and another emitter follower circuit referred to for convenience as the inverter circuit.

The driver portion of the circuit includes two PNP-type transistors 85 and 86 connected in series between a positive and a negative source of potential. The base of transistor 85 is connected to junction 83, and the collector thereof is connected directly to the negative source of potential. The base of transistor 86 is connected to terminal 87 which receives the control signal from the width control circuit, via resistance 88. Resistances 78 and 79 form a voltage divider to provide appropriate bias for transistor 86 (and transistor 102 to be described hereinafter) by providing a reference potential to the input signal after passing through resistance 88. The emitter thereof is connected to the positive source of potential via resistance 89. Connected between the collector of transistor 86 and the emitter of transistor 85 is a voltage divider including the series combination of diode 90, resistance 91, resistance 92 and diodes 93, the diodes being poled to conduct current from the positive to the negative source of potential. Output terminal 94 is connected to the cathode of transistor 86, output terminal 95 is connected to the junction between diode 93 and resistance 91, output terminal 96 is connected to the junction between resistances 91 and 92, and output terminal 97 is connected to the emitter of transistor 85. Resistances 91 and 92 are of equal resistance values and the potential developed across these resistances with respect to output terminal 96 is designated as *t*. Diodes 90 and 93 develop additional and equal voltage drops and therefore the potential across diode 93 and resistance 92 is equal to the potential across diode 90 and resistance 91 and is designated as *s*. Accordingly, if the signal at terminal 96 is designated V, then the signals at terminals 94, 95 and 97 are appropriately designated $V+s$, $V+t$, and $V-s$, respectively. The signals appearing at terminals 94–97 are the same except for the difference in potential.

The inverter portion of the circuit includes three PNP-type transistors 100–102 employed, respectively, as an inverter amplifier, an emitter follower amplifier and a control impedance. The base of transistor 100 is connected to the junction between resistances 91 and 92 of the driver circuit via resistance 103 to receive the signal V as it appears at terminal 96. Resistances 105 and 104 are connected in series between the negative source of potential and ground to provide a voltage divider potential at the junction thereof which is connected directly to the collector of transistor 101 and to the collector of transistor 100 via resistance 106. The emitter of transistor 100 is connected directly to ground. The base of transistor 102 is connected to receive the width control signal applied at terminal 87 by connection thereto through resistance 88. The emitter of transistor 102 is connected to the positive source of potential through resistance 108. Connected between the collector of transistor 102 and the emitter of transistor 101 is a voltage divider made up of diode 109, resistance 110, resistance 111, and diode 112 connected in series. Resistance 113 is connected between the base of transistor 100 and the junction between resistances 110 and 111 to provide negative feedback and improve the linearity of the inverter circuit.

Terminal 114 is connected to the collector of transistor 102, output terminal 115 is connected to junction between diode 112 and resistance 111, and output terminal 160 is connected to the emitter of transistor 101. The voltage divider including resistances 110 and 111 and diodes 109 and 112 is similar to the voltage divider including resistances 91 and 92 and diodes 90 and 93. The potential developed across resistances 110 and 111 is therefore of value *t*, and the potential at the cathode of diode 109 and the anode of diode 112 is of value *s* with respect to the junction between resistances 110 and 111. Since transistor 100 is connected as an amplifier, it inverts the signal V appearing at the base thereof, and hence the signal appearing at the junction between resistances 110 and 111 is appropriately designated as —V. The signals at terminals 114, 115 and 116 are then designated $-V+s$, $-V+t$ and $-V-s$ respectively.

The input-output characteristics of signals appearing at terminals 94–97 and 114–116 are significant and are shown in FIGS. 7*a*–7*g*. For the purposes of this specification, an input-output charcteristic is defined as a plot of the signal magnitude at junction 83 on the horizontal axis versus a corresponding output potential on the vertical axis. Thus, the input-output characteristic of the signal at a designated point is a curve representing the signal at that point versus the signal at the input to the associated driver-inverter circuit, i.e., the input at junction 83.

Transistor 85 is connected in an emitter follower circuit and therefore the signal at the emitter of the transistor is directly proportional to that at the base or, in other words, is not inverted. By properly selecting circuit parameters, the signal at terminal 96 can be adjusted to be zero when the input signal at junction 83 is zero. Under these circumstances, the input-output characteristic with respect to terminal 96 is as shown in FIG. 7*a* where the curve has a positive slope and passes through the zero intercept of both axes.

The output signal $V+t$ at terminal 95 is essentially the same as that at terminal 96 except more positive by a value $t$ and therefore the characteristic with regard to terminal 95 is as shown by the solid line in FIG. 7*b*. This curve has essentially the same positive slope as the curve in FIG. 7*a*, and has an intercept with the vertical axis at $+t$ and an intercept with the horizontal axis at $-b$. The output signal $V+s$ at terminal 94 is more positive than that at terminal 95 and is represented by the characteristic in FIG. 7*c* where the curve has intercepts at $+s$ and $-a$. Similarly, the signal $V-s$ at terminal 97 is negative with respect to terminal 96 and the characteristic is shown in FIG. 7*d* where the solid line curve has intercepts at $-s$ and $+a$. It is noted that the curves in FIGS. 7*a*–7*d* are not exactly parallel but, over the portion of interest, can be assumed to be essentially parallel.

Figures 7E, 7F, 7G:
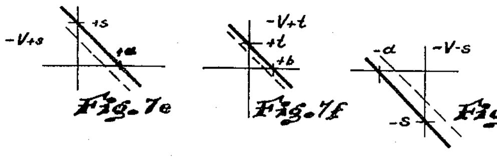

Transistor 100 in FIG. 7 is connected as a conventional amplifier circuit and therefore the circuit inverts the signal V applied at the base of the transistor. As a result of the inversion, the output potential at the collector becomes increasingly negative as the potential at the base becomes increasingly positive. Transistor 101 is connected as an emitter follower circuit and does not invert the signal. Therefore, by appropriate selection of parameter, the characteristic (not shown) of the signal —V appearing at the junction between resistances 110 and 111 would be represented by a curve having a negative slope and passing through the zero intercept of both axes. The signal $-V+t$ at terminal 115 is more positive and has the characteristic shown in FIG. 7*c* by the solid line having intercepts at $+t$ and $+b$. Similarly, the signal $-V+s$ at terminal 114 has the characteristic shown in FIG. 7*f* with intercepts at $+s$ and $+a$, and the signal at terminal 116 has the characteristic shown in FIG. 7*g* with intercepts at $-s$ and $-a$. The curves in FIGS. 7*e*–7*g* are not exactly parallel but can be assumed parallel for the purposes of this specification.

The values of the $s$ and $t$ potentials in the voltage dividers associated with transistors 85 and 101 can be varied by changing the collector-emitter impedance of transistors 86 and 102. As the signal at terminal 87, and hence the signal at the bases of transistors 86 and 102, become more positive, the associated transistors 86 and 102 become less conductive and current flow through the voltage dividers decreases. Because of the similar symmetrical layout in the voltage divider, this decreased current flow tends to decrease the values of the $s$ and $t$ potentials proportionately. The effect on the signals V at terminal 96 and —V at the junction between 110 and 111 is slight and not significant since all the output characteristics as shown in FIGS. 7*b*–7*g* are shown relative to the signals V and —V.

The effect of decreasing the values of $s$ and $t$ upon the signal characteristics at terminals 94, 95, 97, 114, 115 and 116 is as shown by the dotted line curves in FIGS. 7*b*–7*g*. It should be noted that, as the values $s$ and $t$ are decreased, all of the horizontal axis intercept values $a$ and $b$ are decreased proportionately.

*Nonlinear circuits*

Figures 8, 9, 10, 11:
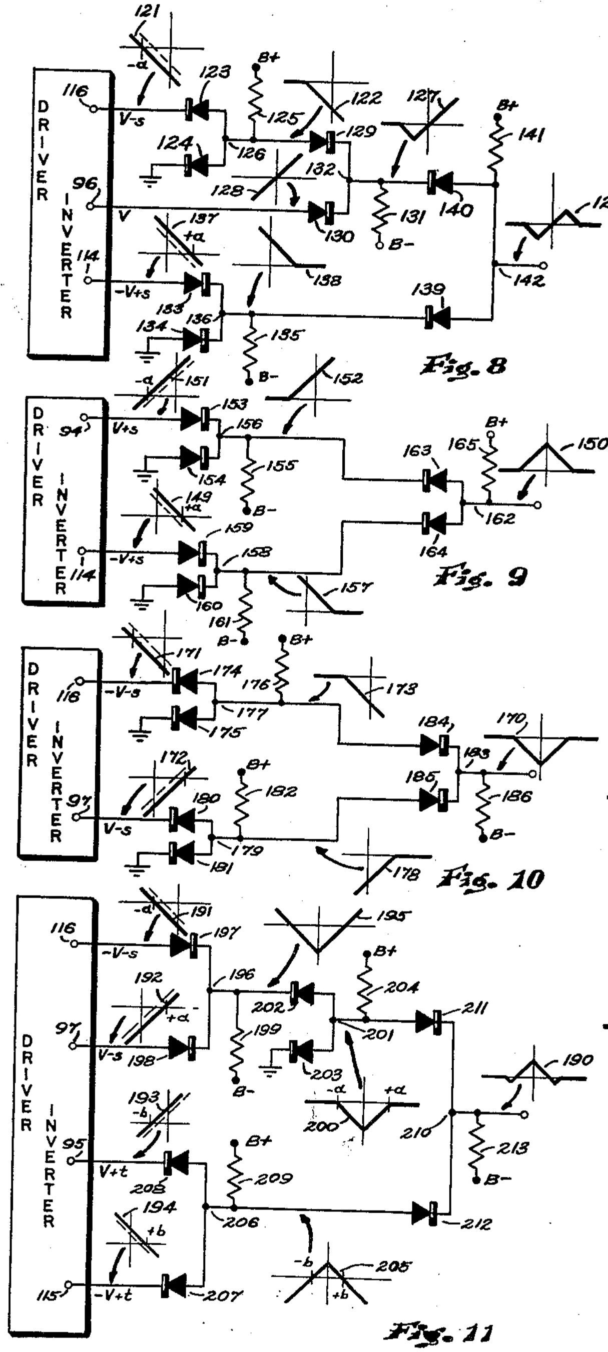
Figure 8A:
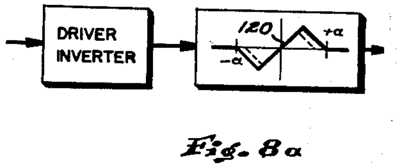

The nonlinear circuit 8 in FIGS. 2 and 4 and the nonlinear circuits 45 and 53 in FIGS. 5 and 6 are illustrated schematically in FIG. 8 and in block form in FIG. 8*a*. The input-output characteristic 120 is formed by combining the characteristics at terminal 116 $(-V-s)$, terminal 96 (V) and terminal 114 $(-V+s)$ of the driver-inverter circuit.

The characteristic 122 is derived by combining characteristic 121 with a ground potential in a negative logic circuit. The negative logic circuit includes diodes 123 and 124 each having their anode connected to a positive source of potential through resistance 125. The cathode of diode 123 is connected to terminal 116, and the cathode of diode 124 is connected to ground. The diode having the most negative cathode potential conducts, and since there is relatively little potential drop across the conducting diode, the potential at junction 126 is essentially the same as the most negative diode cathode potential. For the purposes of this specification, this circuit is referred to as a negative logic circuit, since junction 126 assumes the more negative of the two potentials applied to the cathodes of diodes 123 and 124.

Characteristic 121 indicates that the signal at terminal 116 is positive whenever the magnitude of the input signal to the driven inverter is less than the value $-a$ and, therefore, under these circumstances, diode 124 conducts and the potential at junction 126 is zero. However, if the input potential to the driver-inverter circuit has a value greater than $-a$, the signal at terminal 116 is negative and therefore diode 123 conducts so that, in the range above $-a$, the potential at junction 126 is the same as that at terminal 116. These potentials appearing at junction 126 are represented by characteristic 122.

Characteristic 127 is formed by combining characteristic 122 with characteristic 128 in a positive logic circuit. The positive logic circuit includes a pair of diodes 129 and 130 each having their cathode connected to a negative source of potential through resistance 131. The cathode junction 132 assumes the more positive of the potentials applied to the anodes of diodes 129 and 130, and therefore this type circuit is referred to as a positive logic circuit for the purposes of this specification. For the lower values of the incoming signal applied to the driver-inverter circuit, characteristic 122 provides the more positive signal, and for higher potentials of the incoming signal, characteristic 128 provides the more positive signal. Therefore, when characteristics 122 and 128 are combined in a positive logic circuit, the characteristic 127 results.

Diodes 133 and 134, combined with resistance 135 connected to a negative source of potential, form a positive logic circuit. Characteristic 137 is combined with ground signal to derive characteristic 138 which appears at junction 136. Characteristic 138 is combined with characteristic 127 in the negative logic circuit including diodes 140 and 139 connected to a positive source of potential via resistance 141 to derive the characteristic 120 appearing at junction 142.

As the width control signal applied to terminal 87 of the driver-inverter circuit in FIG. 7 becomes more positive, the horizontal axis intercepts $+a$ and $-a$ of the characteristics 137 and 121 in FIG. 8 decrease as indicated by the dotted lines. The corresponding result on characteristic 120 is shown by the dotted lines. Thus, as the width control signal becomes more positive, the amplitude interval between $-a$ and $+a$ of characteristic 120 decreases, and vice versa.

Figure 9A:
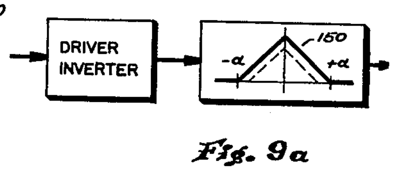

The nonlinear circuit 9 in FIGS. 2 and 4 and the nonlinear circuits 50 and 56 in FIGS. 5 and 6 are illustrated schematically in FIG. 9 and in block form in FIG. 9*a*. Characteristic 150 is derived by combining characteristic 151 $(V+s)$ appearing at terminal 94 of the driver-inverter circuit with characteristic 149 $(-V+s)$ appearing at terminal 114 of the driver-inverter circuit.

More specifically, characteristic 152 is derived at junction 156 by combining characteristic 151 with the ground potential in a positive logic circuit comprising diodes 153 and 154 connected to a negative source of potential via resistance 155. Similarly, characteristic 157 is derived at junction 158 by combining characteristic 149 with a ground potential in a positive logic circuit including diodes 159 and 160 connected to a negative source of potential through resistance 161. Characteristic 150 is then derived at junction 162 by combining characteristic 152 and characteristic 157 in a negative logic circuit including diodes 162 and 164 connected to a positive source of potential through resistance 165. As the width control signal applied to terminal 87 of the driver-inverter circuit in FIG. 7 becomes more positive, the characteristics 151, 152 and 150 change as indicated by the dotted lines, and hence the amplitude interval between $-a$ and $+a$ becomes narrower.

Figure 10A:
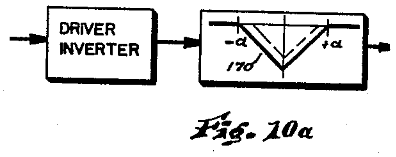

The nonlinear circuits 46 and 54 appearing in FIGS. 5 and 6 are shown schematically in FIG. 10 and in block form in FIG. 10*a*. Characteristic 170 is derived from characteristic 171 $(-V-s)$ and characteristic 172 $(V-s)$ appearing, respectively, at terminals 116 and 97 of the driver-inverter circuit.

Characteristic 173 is derived at junction 177 by combining characteristic 171 with a ground potential in the negative logic circuit including diodes 174 and 175 connected to a positive source of potential through resistance 176. Characteristic 178 is derived at junction 179 by combining characteristic 172 with a ground potential in the negative logic circuit including diodes 180 and 181 connected to a positive source of potential through resistance 182. Characteristic 170 is then derived at junction 183 by combining characteristic 173 with characteristic 178 in a positive logistic circuit including diodes 184 and 185 connected to a negative source of potential through resistance 186. As the width control signal applied to terminal 87 in FIG. 7 becomes more positive, the amplitude interval between $-a$ and $+a$ decreases as brought about by changes in characteristics 171, 172 and 170 as indicated by the dotted lines.

Figure 11A:
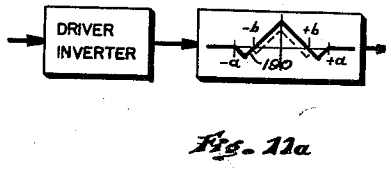

Nonlinear circuit 33 in FIG. 4 and nonlinear circuits 65 and 66 in FIG. 6 are shown schematically in FIG. 11 and in block form in FIG. 11*a*. Characteristic 190 is derived from characteristic 191 $(-V-s)$, characteristic 192 $(V-s)$, characteristic 193 $(V+t)$ and characteristic 194 $(-V+t)$ appearing at terminals 116, 97, 95, 115, respectively, of the driver-inverter circuit.

Characteristic 195 is derived at junction 196 by combining characteristic 191 with characteristic 192 in a positive logic circuit including diodes 197 and 198 connected to a negative source of potential through resistance 199. Characteristic 200 is derived at junction 201 by combining characteristic 195 with a ground potential in the negative logic circuit including diodes 202 and 203 connected to a positive source of potential through resistance 204. The horizontal axis intercepts of both characteristics 195 and 200 are at the points $-a$ and $+a$. Characteristic 205 is derived at junction 206 by combining characteristics 193 and 194 in the negative logic circuit including diodes 207 and 208 connected to a positive source of potential through resistance 209. The horizontal axis intercepts of characteristic 205 are at the points $-b$ and $+b$. Characteristic 190 is then derived at output junction 210 by combining characteristic 200 with characteristic 205 in the positive logic circuit including diodes 211 and 212 connected to a negative source of potential through resistance 213. The characteristic 190 results since the absolute values of $b$ are always proportionately less than the absolute values of $a$.

As the width control signal is applied to terminal 87 of the driver-inverter circuit, the characteristics 191–194 change as indicated by the dotted lines. The absolute values of the horizontal axis intercepts $a$ and $b$ decrease proportionately, and therefore the value of $b$ is always less than $a$. The shape of the characteristic curve 190 remains unchanged, but the amplitude interval between $-a$ and $+a$ decreases as indicated by the dotted line curve.

The logic circuitry employed in FIGS. 8–11 is not the only combination of logic circuits which will derive the desired input-output characteristic. Other suitable combinations of logic circuits can be calculated in accordance with the theorems of Booleon Algebra by assuming that the positive logic circuits in accordance with this specification AND circuits and that the negative logic circuits are OR circuits.

*Feedback control circuits*

A suitable integrating type amplifier for use in the tracking and width control circuits is shown schematically in FIG. 12 and in block form in FIG. 12*a*. This amplifier includes two sections each containing a pair of transistors, and a full-wave integrator connected between the two sections.

The first section includes two NPN-type transistors 221 and 222. Transistor 221 is connected in conventional fashion to form a transistor amplifier, with the emitter connected to ground, the collector connected to a negative source of potential through resistance 223, and the base connected to input terminal 220 via resistance 224. Resistance 225 is connected between the base of transistor 221 and the negative source of potential. Transistor 222 is connected as an emitter follower with the collector connected directly to the negative source of potential, the base connected directly to the collector of transistor 221, and the emitter connected to a positive source of potential through the series connection of diode 226 and resistance 227. The diode is poled in a direction to pass current from the positive source of potential to the emitter of transistor 222. A resistance 228 is connected between the emitter of transistor 222 and the base of transistor 221 to provide negative feedback and improved linearity.

Transistor 221 operates as a conventional amplifying transistor, and therefore any signal applied at terminal 220 is amplified and inverted an appears to the collector of transistor 221. Transistor 222 is an emitter follower amplifier and reproduces, across resistance 227, the signal applied to the base. The emitter follower does not invert the signal. Preferably, transistors 221 and 222 are of the type having a relatively slow response so that high frequency hash may be removed from the incoming signals.

A full-wave integrating circuit is connected between the two sections of the amplifier and includes diodes 230 and 231 in two legs of the bridge circuit, and resistances 232 and 233 in the other two legs. A pair of capacitors 234 and 235 are connected in series across the bridge with the junction between the capacitors connected to ground. If a positive incoming signal is applied at junction 236 between diodes 230 and 231, diode 231 conducts and capacitor 235 and resistance 233 serve as an integrator for this signal. If the signal applied to junction 236 is negative, then diode 230 conducts and resistance 232 and capacitance 234 serve as an integrating circuit.

The remaining section of the integrating amplifier includes two PNP-type transistors 240 and 241. Transistor 240 is a conventional amplifying transistor with the base connected to receive the signals from the full-wave integrator, the emitter connected directly to ground, and the collector connected to a negative source of potential through resistance 242. Transistor 241 provides a second stage of amplification and has its base connected directly to the collector of transistor 240, its collector connected to a negative source potential via resistance 243, and its emitter connected to a positive source of potential through resistance 244. The parallel combination of resistance 245 and capacitance 246 is connected between the emitter of transistor 241 and the base of transistor 240 to provide negative feedback and additional integration.

Two output terminals 247 and 248 are connected, respectively, to the collector and emitter of transistor 241. The signal appearing at terminal 248 is not inverted with respect to terminal 220 and, therefore, as the average amplitude of the applied pulses increases positively, the direct current control signal at terminal 246 becomes increasingly positive. Terminal 248 is used when the integrating amplifier is connected in width control circuits 17 (FIGS. 2 and 4), 58 (FIG. 5), 67 and 68 (FIG. 6). The signal at terminal 247 is inverted with respect to the signal applied at terminal 220 and becomes increasingly negative as the average value of pulses applied to terminal 220 increases in the positive direction. Terminal 247 is used when the integrating amplifier is used in tracking control circuits 12 (FIGS. 2 and 4), 56 and 57 (FIGS. 5 and 6).

The parameters of the circuit are so selected that, when the integrating amplifier is used in a width control circuit, the signal at terminal 248 is zero when the signal at terminal 220 is zero. When the amplifier is employed in a tracking control circuit the parameters are so adjusted that the signal at terminal 247 is substantially negative. These desired values at terminals 247 and 248 can be most easily attained by adjusting the value of resistance 225.

*Control logic circuits*

The tracking control circuits in FIG. 5 and the tracking control circuits and the width control circuits in FIG. 6 include control logic circuits which inhibit output pulses emanating from the respective channel unless the corresponding input pulses in all other channels are within their respective amplitude acceptance intervals. For the purposes of explanation, it is assumed that the control logic circuit shown schematically in FIG. 13 and in block form in FIG. 13*a* is for channel X and that the other channels are channels Y . . . N. The output signal from channel X is applied to terminal 250 and has a characteristic 247, if it is for a tracking control circuit, or has characteristic 248, if it is for a width control circuit. As indicated by the characteristics 247 and 248, pulses applied at terminal 250 may be either negative or positive, and therefore, in order to properly inhibit such signals, negative and positive logic circuits are required as well as positive and negative pulses from the other channels.

The negative logic circuit includes diode 252 having a cathode connected to terminal 250 to receive the pulses from channel X, a diode 253 connected to terminal 254 to receive the positive pulses from channel Y which are developed in accordance with characteristic 249, and diode 255 connected to terminal 256 to receive pulses from a channel N. Additional diodes and terminals could be added for each additional channel included in the pulse height tracker. The anodes of diodes 252–255 are connected to junction 257 and to the positive source of potential via resistance 258.

Since the diodes form a negative logic circuit, the potential at junction 257 assumes the most negative potential value applied to the cathodes of diodes 252–255. Therefore, if a positive pulse is not received from each of the other channels Y . . . N, then there cannot be any positive potential at terminal 257. Thus, any positive pulse appearing at terminal 250 cannot pass to junction 257 unless positive pulses from the other channels are applied simultaneously to respective terminals 254 and 256.

It is also necessary to similarly block any negative pulses appearing at terminal 250, and this is accomplished in a positive logic circuit. The positive logic circuit includes diodes 260–262 each having their cathode connected to the junction 263 and to a negative source of potential via resistance 264. The anode of diode 260 is connected to junction 257 to receive the output from the negative logic circuit, and diodes 261 and 262 are connected to terminals 265 and 266 to receive the negative pulse signals from channels Y and N, respectively. Junction 263 assumes the most positive of the potentials applied to the anodes of diodes 260–262. Accordingly, if a negative pulse is missing from any one of the channels, the potential at junction 263 cannot go negative, and hence any negative pulses appearing at junction 257 are blocked and cannot appear at junction 263.

It should be noted that the pulses applied to terminals 265 and 266 are the same as the pulses applied to terminals 254 and 256, respectively, except for the change in polarity. Accordingly, an absence of a pulse at terminal 254 would necessitate the absence of a pulse at terminal 265. Therefore, whenever the incoming pulse applied to any one of the channels is not within the respective amplitude interval, both the positive and negative output pulses from that channel are absent. Under these circumstances, the output signal from the control logic circuit as it appears at junction 263 can be neither positive nor negative and hence must be zero.

Up to this point, it has been assumed that the pulses received from other channels are either present or absent and therefore either totally inhibit or inhibit not at all. As indicated by the input-output characteristics, for example characteristics 249 and 259, the pulses from the other channels may assume various values and therefore would affect the inhibiting action accordingly. Where there are only two channels, this results in a two-dimensional input-out characteristic, which is illustrated in FIG. 14, if the control logic circuit is included in a width control circuit, and in FIG. 15 if the control logic circuit is included in a tracking control circuit.

Referring to FIG. 14, the output from channel X has a characteristic 248. The positive output from channel Y has a characteristic 249, and the negative output has a characteristic 259. The magnitude of the pulse signal emanating from the output of the control logic circuit is represented in the third coordinate Z. The shape of the characteristic is seen to take the three-dimensional configuration of a positive wedge-shaped prism, as caused by the positive portion of characteristic 248, with negative wedge-shaped prisms 271 and 272 on each side, as caused by the negative portions of characteristic 248. Characteristic 249 causes the sides 273 and 274 of the positive prism 270 to slope inwardly. Characteristic 259 causes the sides 275–278 of the negative prisms to slope inwardly.

It should be noted that the dimensions and shape of this three-dimensional characteristic change as the amplitude interval width of the respective channels are adjusted. It is significant to note that if an incoming pulse is received which is not within the amplitude interval between $-a$ and $+a$ of its respective channel, there can be no output signal from the control logic circuit. If the incoming pulses in both channels are within their respective amplitude intervals between $-a$ and $+a$, then there is an output pulse having a magnitude Z as determined by the three-dimensional characteristic of FIG. 14.

If the control logic circuit in FIG. 13 is employed in the tracking control circuit, the characteristic of the signal applied at terminal 250 is represented by characteristic 251, and the resulting characteristic curve is as shown in FIG. 15. This three-dimensional characteristic is seen to include a positive wedge-shaped prism 280 and a negative wedge-shaped prism 281 in accordance with the positive and negative portions of characteristic 247. The sides of the positive prism 280 slope inwardly because of characteristic 249, and the sides of the negative prism 281 slope inwardly because of characteristic 259. The magnitude at the output (Z) of the control logic circuit depends upon the magnitudes of the X and Y inputs and is determined in accordance with the three-dimensional characteristic of FIG. 15.

The logic circuit in width control circuit 58, FIG. 5, and the output circuit 69, FIG. 6, are the same and include a multiple input logic circuit shown schematically in FIG. 16 and in block form in FIG. 16*a*. This logic circuit includes diodes 290–292 with the anodes thereof connected to junction 293 and to a positive source of potential through resistance 294. The cathodes of the diodes are connected respectively to input terminals 295–297 which receive the positive pulses from channels X, Y . . . N. Junction 293 assumes the value of the most negative potential applied to the cathodes of diodes 290–292. The input-output characteristic for this negative logic circuit is illustrated in FIG. 17. This three-dimensional characteristic takes the form of a single positive wedge-shaped prism 300, the slope of the sides being determined by the characteristics 298 and 299 of the X and Y channels respectively.

While only a limited number of advantageous embodiments have been illustrated, it is obvious that a large number of similar pulse height trackers can be constructed without departing from the scope of this invention. The scope of the invention is pointed out more partcularly in the appended claims.

What is claimed is:

1. In a pulse height discriminator for selecting desired electrical pulses from a larger group of received electrical pulses on the basis of pulse amplitude, the combination of
   - a nonlinear circuit having a variable width amplitude acceptance interval for providing an output pulse whenever an electrical pulse is received having an amplitude within said amplitude interval,
     - said amplitude interval having a center amplitude range within, said output pulses being of one polarity if the amplitude of the received pulse is within said center and of the opposite polarity when not within said center range,
   - feedback circuit means for integrating and amplifying said output pulses to derive a control signal, and
   - means within said nonlinear circuit for adjusting the width of said amplitude acceptance interval in accordance with said control signal.

2. In a pulse height tracker for selecting desired electrical pulses on the basis of amplitude from a larger group of received pulses, the combination of
   - pulse amplitude discriminator means for providing an output indication in response to received electrical pulses with an amplitude within an amplitude acceptance interval thereof, and
   - feedback means for so adjusting the amplitude of all received electrical pulses that only desired electrical pulses come within said amplitude acceptance interval, said feedback means comprising
     - nonlinear circuit means for providing a signal of one polarity when a received electrical pulse having an amplitude within said amplitude interval exceeds the mid value within said interval, and for providing a signal of the opposite polarity when a received electrical pulse having an amplitude within said amplitude interval does not exceed said mid value,
     - amplifier means for providing a signal which varies in accordance with the average value of signals from said nonlinear circuit means, and
     - mixing means for combining the signal from said amplifier with said received electrical pulses to vary the amplitude of said pulses.

3. A pulse height tracker in accordance with claim 2 wherein said amplifier is operative to integrate received signals.

4. A pulse height tracker in accordance with claim 2 wherein said discriminator means automatically adjusts the amplitude acceptance interval in accordance with the amplitude dispersion of the desired electrical pulses.

References Cited in the file of this patent

UNITED STATES PATENTS

| | | |
|---|---|---|
| 2,406,882 | Young | Sept. 3, 1946 |
| 2,489,297 | Lahen et al. | Nov. 29, 1949 |
| 2,697,201 | Harper | Dec. 14, 1954 |
| 2,779,869 | Gerks | Jan. 29, 1957 |
| 3,100,839 | Nathan et al. | Aug. 13, 1963 |